May 26, 1931.  J. W. STARK  1,807,106
RIM END CONNECTER
Filed Nov. 2, 1928   2 Sheets-Sheet 1

Inventor
John Will Stark
By Church & Church
His Attorneys

May 26, 1931.　　　J. W. STARK　　　1,807,106
RIM END CONNECTER
Filed Nov. 2, 1928　　　2 Sheets-Sheet 2
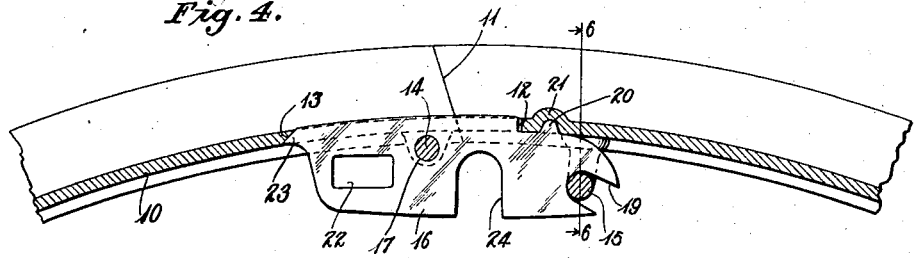
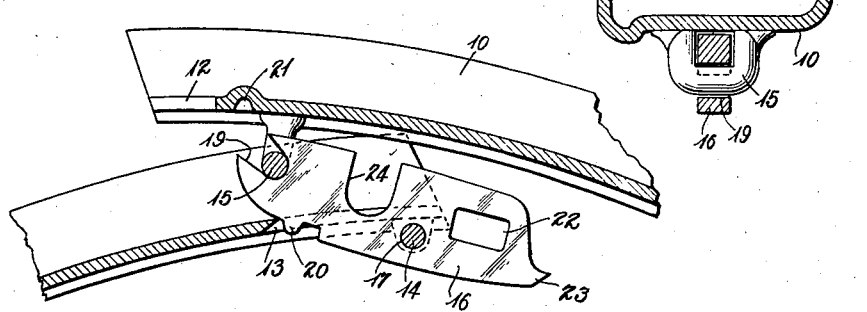
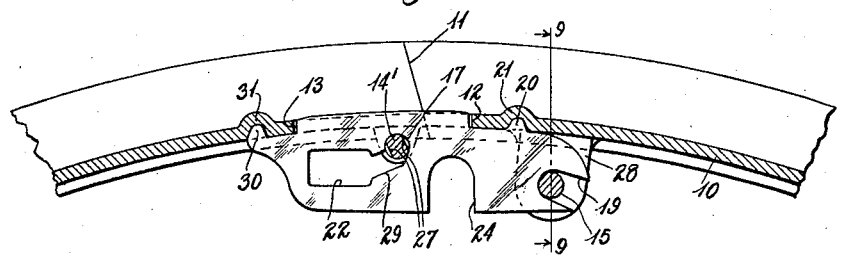
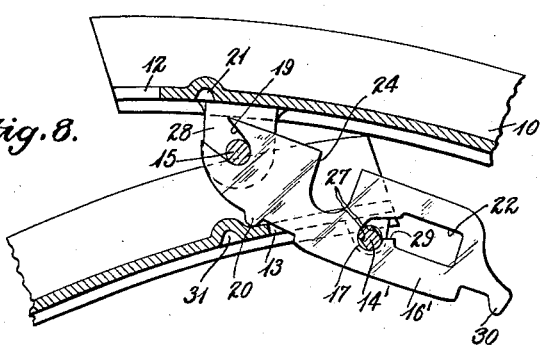
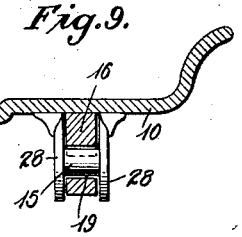
Inventor
John Will Stark
By Church & Church
His Attorneys Patented May 26, 1931

1,807,106

UNITED STATES PATENT OFFICE

JOHN WILL STARK, OF BOWLING GREEN, KENTUCKY

RIM END CONNECTER

Application filed November 2, 1928. Serial No. 316,830.

My invention relates to demountable rims and has to do, more particularly, with means for expanding and contracting demountable rims of the transplit type. My invention relates to improvements upon the demountable rim and rim-end connecting means shown in my pending application, Serial No. 290,558, filed July 5th, 1928.

With the advent of balloon tires, the demountable rims used on automobile wheels have become of smaller diameter and greater width and, consequently, are stiffer than they used to be. As a result of this, the collapsing of such transplit rims, to remove the tires therefrom, has become a more difficult problem. The principal object of my invention is to provide a simple and relatively cheap construction for connecting the ends of a transplit rim, which forms an efficient rim-operating means for expanding and contracting the rim and, further, prevents the circumferential separation of the rim ends when the rim is in expanded position.

A further object of my invention is to provide a transplit demountable rim and means for expanding and contracting the rim and connecting the rim ends, which is made of few parts and can be manufactured at low cost.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which Figure 1 is a side elevation of a transplit demountable rim having a rim-operating lever and rim-end connecting device embodying my invention;

Fig. 4 is a vertical, sectional view through the rim ends, with the rim in expanded position, showing the rim-operating lever in side elevation;

Fig. 5 is a vertical, sectional view, through the rim ends, with the rim in contracted position, showing the rim-operating lever in side elevation;

Fig. 6 is a detail, sectional view taken on the line 6—6 of Fig. 4;

Fig. 7 is a vertical, sectional view through the rim ends, with the rim in expanded position, showing in side elevation another form of rim-operating lever embodying my invention;

Fig. 8 is a view corresponding to Fig. 7 but showing the rim in contracted position; and Fig. 9 is a detail, sectional view taken on the line 9—9 of Fig. 7.

In the drawings, the same reference numerals refer to the same parts throughout the several views and the sectional views are taken looking in the direction of the arrows at the ends of the section lines.

In general, my invention consists in providing a rim-operating lever pivotally connected with the opposite rim ends, and adapted to receive an operating tool by which the lever can be swung on its pivot to contract or expand the rim. One feature of my invention consists in providing a shackle member fixed to and extending inwardly from one rim end, adjacent the split, on which the rim-operating lever is permanently pivoted so as to be confined to pivotal movement about this shackle, the other end of the lever having a pivotal engagement with a member projecting inwardly from the opposite rim end. A further feature of my invention consists in providing a projection on the outer edge of the rim-operating lever, which, when the rim is in expanded position, is received in a recess formed in one of the rim ends and thereby prevents circumferential displacement of that rim end with respect to the lever. Another feature of my invention consists in providing a slot in one end of the rim-operating lever, which is inclined at an angle to the outer edge of the lever and receives a pivot member attached to and projecting inwardly from the corresponding rim end. Due to the inclination of this slot, any tendency of the rim ends to separate, when the rim is in expanded position, is resisted by the pressure of the pivot member against the wall of the slot, but, when the rim is in contracted position, the rim end can be quickly and easily detached from the lever through the open end of the slot.

A further feature of my invention consists in providing, in that portion of the rim-operating lever on the opposite side of its pivot from the split in the rim, a slot or opening adapted to receive an operating tool, through which power can be applied to rock the lever on its pivot and thereby contract or expand the rim. If desired, the bearing opening, provided in the rim-operating lever to receive the pivot, may be connected by an inclined slot with the tool-receiving opening, and, in such case, the sides of the pivot may be flattened so that it can only pass through the inclined slot when the lever occupies a predetermined position with respect to the rim end. This is a feature of some advantage from the manufacturing standpoint, as it facilitates the assembly of the parts.

Another feature of my invention consists in providing the lever with two projections which, when the rim is in expanded position, are received in recesses formed in the opposite rim ends, and, if this construction is used, the circumferential separation of the rim ends is prevented entirely by the rim-operating lever, which acts as a tie positively connecting the rim ends.

Figure 1:
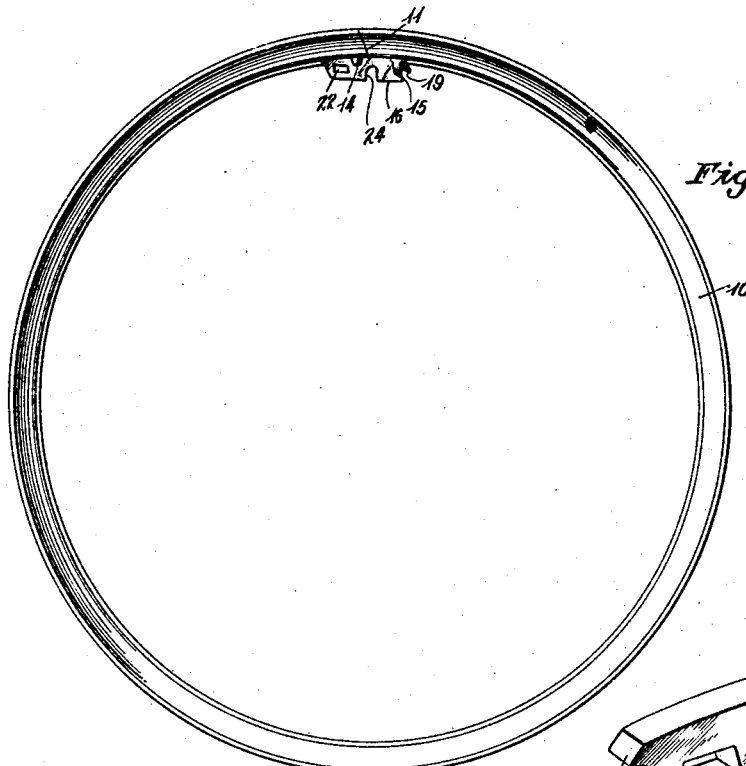
Figure 3:
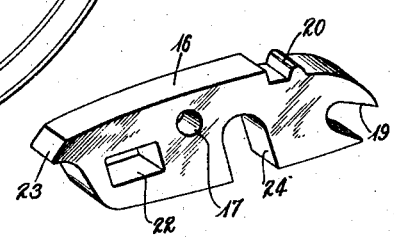
Fig. 3 is a perspective view of the rim-operating lever detached.
Figure 2:
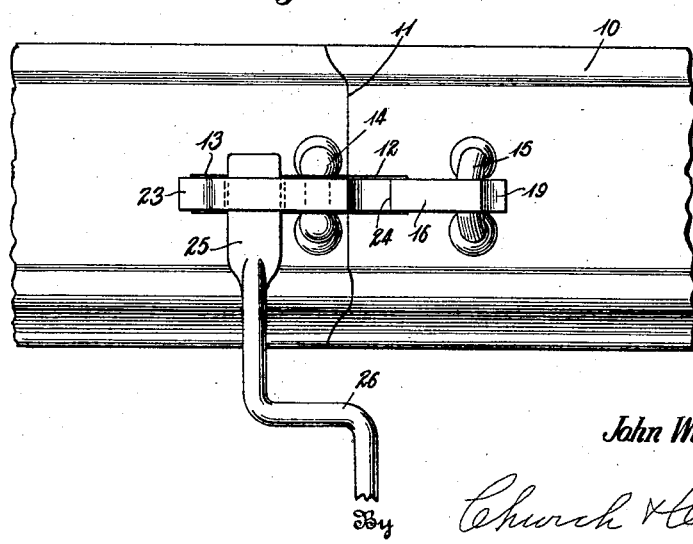
Fig. 2 is a bottom plan view of the rim at the split, showing an operating tool applied in position to operate the lever connecting the rim ends.

Referring to the numbered parts of the drawings, in which I have illustrated the embodiment of my invention which, at the present time, I consider my preferred form, I have shown a transplit demountable rim 10, the split in the rim being indicated at 11. This rim is shown with the usual upright flanges adapted to receive a straight-side tire, but, of course, other forms of flanges may be used if desired. Slots 12 and 13 are formed, at approximately the center line of the rim base, in the opposite rim ends, these slots being in alinement with each other when the rim is in expanded position, as shown in Fig. 2. The shackle member 14 is rigidly attached to the rim base, located adjacent the split in the rim and extends across the slot 13, as shown in Fig. 2. A similar shackle member 15 is attached to the opposite rim end at a point slightly beyond the end of the slot 12. These shackle members 14 and 15 constitute the pivots by which the operating lever is pivotally connected to the rim ends. The rim-operating lever 16 connects the rim ends and bridges the split in the rim. It is applied to the rim ends edgewise, as shown in Fig. 4. The rim-operating lever has a hole 17 therein, through which the shackle 14 passes, so that the lever pivots around this shackle and is confined thereby to pivotal movement. A portion of the outer edge of the lever projects above the body of the same and is received in the alined slots 12 and 13, when the rim is in expanded position, as shown in Fig. 4. This holds the rim ends in lateral alinement.

One end of the rim-operating lever is provided with a slot 19 inclined at an angle to the outer edge of the lever, which receives the shackle member 15, as shown in Fig. 4. Due to the inclination of the slot 19, any force tending to separate the rim ends circumferentially is resisted by the pressure of the pivot 15 against the wall of the slot 19, but, when the rim is in contracted position, as shown in Fig. 5, a slight distortion of the rim permits of moving shackle 15 out of its engagement in the slot 19, so as to separate the rim-operating lever from the rim end which carries the shackle 15.

As a further means for preventing circumferential separation of the rim ends, a projection 20 is provided on the outer edge of the rim-operating lever which, when the rim is in expanded position, is received in a depression 21, formed in the rim base, as shown in Fig. 4. It will be observed that circumferential separation of the rim ends is prevented by reason of the fact that the lever is pivoted on the shackle 14, which is fixed to one rim end, in such a way that it is confined to pivotal movement only about that shackle, while the projection 20 engages in the recess 21 of the opposite rim end, and the pivot member of the shackle 15 engages the inclined wall of the slot 19, to prevent circumferential displacement of that rim end with respect to the lever.

An oblong slot 22 is formed in the rim-operating lever on the opposite side of the pivot 14 from the split 11. This slot 22 receives the blade 25 of an operating tool 26 by which power may be applied to rock the lever about the pivot 14. The lever has a projecting tail 23, which may be engaged by a suitable latch (not shown), for instance, of the sort shown in my pending application, above referred to, in order to prevent accidental movement of the rim-operating lever. If desired, a notch 24 may be formed in the lever, opening from the inner edge thereof, which may receive a rim securing bolt carried by the felly of the wheel, in order to transmit drive from felly to rim.

When the operator desires to contract the rim to remove a tire therefrom, the latch may be swung to one side from beneath the tail 23 and the operating tool inserted in the slot 22. Power thus applied rocks the lever about the pivot 15, swinging the lever through the slot 13 to the position shown in Fig. 5. The movement of the lever in the opposite direction will move the rim from contracted to expanded position.

In Figs. 7, 8, and 9, I have shown a rim-operating lever embodying some features of my invention, but having certain additional features. In this embodiment, the bearing opening 17 in the rim-operating lever 16' is connected by an inclined slot 29 with the oblong tool-receiving opening 22. The sides of the pivot shackle 14' are flattened, at 27, and the width of the slot 29 is such that the pivot 14' can only pass through the slot when the lever is turned to a predetermined position with respect to the rim end which carries the shackle 14'. This construction is of particular advantage from the manufacturing standpoint, in that the shackle member 14' can be passed endwise through the tool receiving opening 22 and then welded or otherwise fastened to the base of the rim, after which the lever can be adjusted to the proper position to permit the pivot 14' to pass through the slot 29 into the bearing opening 17. When once seated in the bearing opening, the pivot 14' stays there in the normal use of the device, that is, during movement of the rim ends from expanded to contracted position, and vice versa.

I also provide this rim-operating lever shown in Figs. 7, 8, and 9 with two projections, 20 and 30, extending outwardly from the outer edge thereof. As in the construction first described, the projection 20 is received in the recess 21, whereas the projection 30 is received in a similar recess 31 formed in the opposite rim end, when the rim is in expanded position, as shown in Fig. 7. When this construction is employed, the lever acts as a yoke coupling the rim ends together and preventing circumferential separation thereof, since integral parts of the lever engage in recesses in the opposite rim ends. In Figs. 7, 8, and 9, I have also shown a modified arrangement of the pivot 15 which is mounted between and carried by two ears 28, rigidly fastened to the base of the rim and projecting inwardly therefrom. The rim operating lever shown in Figs. 7, 8, and 9 is operated the same as the lever first described, to contract and expand the rim.

I am aware that the construction illustrated and described herein may be varied considerably without departing from the spirit of my invention, and, therefore, I claim my invention broadly, as indicated by the appended claims.

What I claim is:

1. The combination of a transplit demountable rim, a narrow shackle member fixed to the rim adjacent the split and extending inwardly from the rim base, a rim-operating lever permanently pivoted on said shackle and confined thereby to pivotal movement, said lever having an integral projection on its outer edge, the opposite rim end having a recess formed therein receiving said projection to prevent circumferential displacement of the rim end with respect to the lever when the latter is in rim-expanding position, and a member projecting inwardly from said rim end, said lever having a portion pivotally engaging said member, said member being detachable from the lever when the rim is contracted.

2. The combination of a transplit demountable rim, a narrow shackle member fixed to the rim adjacent the split and extending inwardly from the rim base, a rim-operating lever permanently pivoted on said shackle and confined thereby to pivotal movement, said lever having, in the opposite end thereof, a slot inclined at an angle to the outer edge of said lever, and a member fixed to and projecting inwardly from the opposite rim end and having a pivot removably received in said inclined slot.

3. The combination of a transplit demountable rim, a radially inwardly extending fin-like rim-operating lever pivoted on one end of the rim adjacent to and bridging the split and having an integral projection on its outer edge and, in the opposite end thereof, a slot inclined at an angle to the outer edge of the lever, the opposite rim end having a recess formed therein receiving said projection to prevent circumferential displacement of the rim end with respect to the lever when the latter is in rim-expanding position, and a member fixed to and projecting inwardly from the rim end and having a pivot removably received in said inclined slot.

4. The combination of a transplit demountable rim, a narrow shackle member fixed to the rim adjacent the split and extending inwardly from the rim base, a rim-operating lever permanently pivoted on said shackle and confined thereby to pivotal movement, said lever having, in the portion thereof on the opposite side of said pivot from the split, a slot adapted to receive an operating tool, and a member fixed to and projecting inwardly from the opposite rim end, said lever having a portion pivotally engaging said member and said member being detachable from said lever when the rim is contracted.

5. The combination of a transplit demountable rim, a radially inwardly extending fin-like rim-operating lever permanently pivoted on one end of the rim adjacent to and bridging the split, said lever having, in the portion thereof on the opposite side of its pivot from the split, a slot adapted to receive an operating tool and, in the opposite end thereof, a slot inclined at an angle to the outer edge of the lever, and a member fixed to and projecting inwardly from the opposite rim end and having a pivot removably received in said inclined slot.

6. The combination of a transplit demountable rim, a narrow shackle member fixed to the rim adjacent the split and extending inwardly from the rim base, a rim-operating lever permanently pivoted on said shackle and confined thereby to pivotal movement, said lever having an integral projection on its outer edge, and, in the opposite end thereof, a slot inclined at an angle to the outer edge of the lever, the opposite rim end having a recess formed therein receiving said projection to prevent circumferential displacement of the rim end with respect to the lever when the latter is in rim-expanding position, and a member fixed to and projecting inwardly from said rim end and having a pivot removably received in said inclined slot.

7. The combination of a transplit demountable rim, a narrow shackle member fixed to the rim adjacent the split and extending inwardly from the rim base, a rim-operating lever permanently pivoted on said shackle and confined thereby to pivotal movement, said lever having, in the portion thereof on the opposite side of its pivot from the split, a slot adapted to receive an operating tool, and having an integral projection on its outer edge, the opposite rim end having a recess formed therein receiving said projection to prevent circumferential displacement of the rim end with respect to the lever when the latter is in rim-expanding position, and a member projecting inwardly from said rim end and pivotally and detachably engaging said lever.

8. The combination of a transplit demountable rim, a radially inwardly extending fin-like rim-operating lever permanently pivoted on one end of the rim adjacent to and bridging the split, said lever having, in the portion thereof on the opposite side of its pivot from the split, a slot adapted to receive an operating tool, on its outer edge, an integral projection and, in the opposite end thereof, a slot inclined at an angle to the outer edge of the lever, the opposite rim end having a recess formed therein receiving said projection to prevent circumferential displacement of the rim end with respect to the lever when the latter is in rim-expanding position, and a member fixed to and projecting inwardly from the rim end and having a pivot removably received in said inclined slot.

9. The combination of a transplit demountable rim, a member fixed to and projecting inwardly from one end of the rim adjacent the split and carrying a pivot, a radially inwardly extending fin-like rim-operating lever bridging said split and having a bearing opening for said pivot, a slot adapted to receive an operating tool, and an inclined slot connecting the tool-receiving slot and the bearing opening, and a member projecting inwardly from the opposite rim end and pivotally engaging the opposite end of said lever.

10. The combination of a transplit demountable rim, a member fixed to and projecting inwardly from one end of the rim adjacent the split and carrying a pivot having flattened sides, a rim-operating lever bridging said split and having a bearing opening for said pivot, an opening of non-circular contour adapted to receive an operating tool and an inclined slot connecting said openings and permitting the pivot to pass therethrough only when the lever is turned at a predetermined angle to the rim end, and a member projecting inwardly from the opposite rim end and pivotally engaging the opposite end of said lever.

11. The combination of a transplit demountable rim having recesses formed in the rim base on opposite sides of the split, pivot members carried by and projecting inwardly from the opposite rim ends, and a radially inwardly extending fin-like rim-operating lever pivotally connected with said pivot members and bridging the split and having integral projections engaging in said recesses when the lever is in rim-expanding position, whereby the forces tending to cause circumferential separation of the rim ends are resisted solely by the lever.

JOHN WILL STARK.